US007244056B2

(12) United States Patent
Koike et al.

(10) Patent No.: US 7,244,056 B2
(45) Date of Patent: Jul. 17, 2007

(54) VEHICLE LAMP

(75) Inventors: Teruo Koike, Tokyo (JP); Ken Kagaya, Tokyo (JP); Yoshiaki Akiyama, Tokyo (JP); Masanari Tsukada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 10/849,548

(22) Filed: May 20, 2004

(65) Prior Publication Data

US 2005/0018440 A1 Jan. 27, 2005

(30) Foreign Application Priority Data

Jul. 25, 2003 (JP) ............................ 2003-201528

(51) Int. Cl.
*B60Q 1/00* (2006.01)

(52) U.S. Cl. ...................... 362/539; 362/507; 362/510; 362/538

(58) Field of Classification Search ................ 362/507, 362/509, 510, 538, 539, 293, 487, 512, 523
See application file for complete search history.

(56) References Cited

U.S. PATENT DOCUMENTS 5,938,323 A * 8/1999 McMahan ................... 362/539
6,494,603 B1 * 12/2002 Takada ........................ 362/538
6,561,688 B2 * 5/2003 Albou ........................ 362/539
6,776,513 B2 * 8/2004 Albou ........................ 362/507
6,857,768 B2 * 2/2005 Watanabe et al. ........... 362/539
2002/0003709 A1 * 1/2002 Albou ........................ 362/538

* cited by examiner

*Primary Examiner*—Sandra O'Shea
*Assistant Examiner*—Zahra I. Bennett
(74) *Attorney, Agent, or Firm*—Cermak & Kenealy, LLP

(57) ABSTRACT

A vehicle lamp can include a light source and a reflector whose first focal position lies in the vicinity of the light source, the reflector preferably includes a concave spheroidal surface that reflects light from the light source frontward. A projection lens can be disposed so that its focal point lies in the vicinity of a second focal position of the reflector in front of the light source, the projection lens including an aspherical convex lens that focuses light from the reflector and that irradiates the light frontward. A shutter can be disposed in the vicinity of the second focal position of the reflector, the shutter forming a cutoff for low light distribution. The shutter can be thickly formed so that it is positioned in front of the focal position of the projection lens, and the shutter can be slanted at an end edge that forms the cutoff so that the shutter becomes lower towards the projection lens in relation to the optical axis direction.

13 Claims, 6 Drawing Sheets

VEHICLE LAMP

This invention claims the benefit of Japanese patent application No. 2003-201528, filed on Jul. 25, 2003, which is hereby incorporated by reference.

FIELD OF THE INVENTION

The present invention relates to a vehicle lamp, and more particularly to a vehicle lamp that can be used as a headlight or an auxiliary headlight disposed in the front part of an automobile. The present invention also relates to a method for operating a vehicle lamp.

DESCRIPTION OF RELATED ART

Conventionally, automobile headlights have been configured as shown in FIGS. 4 and 5. Namely, in FIG. 4, a headlight 1 is formed as an automobile headlight that has a bulb 2 serving as a light source, a reflector 3 that reflects light from the bulb 2 frontward, a projection lens 4 that focuses the light reflected from the reflector 3, and a shutter 5 that forms a cutoff for low light distribution.

The reflector 3 includes a spheroidal surface, and a light-emitting portion of the bulb 2 is disposed in the vicinity of a first focal position of the reflector 3.

The projection lens 4 is configured as an aspherical convex lens and is disposed such that a bulb-side focal position thereof is positioned in the vicinity of a second focal position of the reflector 3.

In the headlight 1 of this configuration, light emitted from the bulb 2 is reflected by the reflector 3, proceeds towards the second focal point of the reflector 3, is focused by the projection lens 4 and is irradiated frontward. Thus, a portion of a so-called low beam light distribution pattern is irradiated due to the cutoff being formed by the shutter 5.

Moreover, in the headlight 1 of this configuration, an end edge 5*a* forming the cutoff of the shutter 5 is formed to be thick in the optical axis direction as shown in FIG. 4 in order to reduce chromatic aberration resulting from the projection lens 4.

By using this thick shutter 5, light transmitted substantially parallel through a point "a" in the middle of the end edge 5*a* that forms the cutoff of the shutter 5 reaches the vicinity of a center on a standard projection screen.

With respect thereto, light transmitted through the point "a" and made incident at peripheral edges (in particular the upper edge and lower edge) of the projection lens 4 becomes red light L1 transmitted through the upper edge of the projection lens 4 and blue light L2 transmitted through the lower edge of the projection lens 4. This light is respectively cut off by the thickness of the shutter 5 so that light transmitted through a point b which is slightly above the end edge 5*a* of the shutter 5 reaches the vicinity of, for example, 0.2° D on the standard projection screen.

Thus, because the light L1 and the light L2 that are transmitted through the peripheral edges of the projection lens 4 and dispersed by chromatic aberration are superposed on one another at a bright portion lower than a cutoff line, coloring is reduced and becomes inconspicuous.

Incidentally, in the headlight 1 of this configuration, the end edge 5*a* of the shutter 5 is made thicker in order to further reduce coloring based on the chromatic aberration of the projection lens 4. However, when the shutter 5 is made thicker, the amount of light cut off by the thickness of the shutter 5 increases and the amount of effective light irradiated frontward drops.

SUMMARY OF THE INVENTION

According to an aspect of the present invention, a vehicle lamp can be provided that is suited for a headlight or an auxiliary headlight, is inexpensive due to its simple configuration, reduces coloring resulting from chromatic aberration of a projection lens, and is configured to control a loss in light amount resulting from the thickness of a shutter.

According to another aspect of the present invention there is provided a vehicle lamp that can include a light source; a reflector whose first focal position lies in the vicinity of the light source, the reflector including a concave or concave spheroidal surface that reflects light from the light source frontward; a projection lens that is disposed so that its focal point lies in the vicinity of a second focal position of the reflector in front of the light source, the projection lens including a convex lens or an aspherical convex lens that focuses light from the reflector and that irradiates the light frontward; and a shutter that is disposed in the vicinity of the second focal position of the reflector. The shutter can form a cutoff for low light distribution, wherein the shutter is thickly formed so that it is positioned in front of the focal position of the projection lens. The shutter can also be slanted at an end edge forming the cutoff so that the shutter becomes lower towards the projection lens in relation to the optical axis direction.

In accordance with another aspect of the invention, the shutter can include means for reducing a loss in the amount of light that results from the thickness of the shutter and for mixing light passing through the upper edge and the lower edge of the projection lens such that the color of light emitted from the vehicle lamp is white. The means can be a slanted end edge of the shutter. In addition, the slanted edge can be uniformly slanted, or can be slanted in stepwise increments, at different angles along the slant, etc.

Preferably, the angle of slant at the end edge of the shutter is set at angles that differ per respective site.

According to another aspect of the invention, a method for operating a vehicle lamp can include applying electricity to the light source, reflecting light from the light source towards the projection lens, blocking a portion of light passing from the reflector to the projection lens by the end edge of the shutter, allowing a top edge portion of light to pass from the reflector to a top edge of the projection lens, and allowing a bottom edge portion of light to pass from the reflector to a bottom edge of the projection lens such that the top edge portion of light mixes with the bottom edge portion of light to emit an approximately white light from the vehicle lamp.

Light emitted from the light source can be reflected by the reflector, proceed towards the second focal position of the reflector, be focused by the projection lens, and can be irradiated frontward. At this time, a portion of a so-called low beam light distribution pattern can be irradiated due to the cutoff being formed by the shutter.

Because the shutter is thickly formed, it is possible that light that is incident at the upper edge or the lower edge of the projection lens becomes red light or blue light due to the chromatic aberration of the projection lens. The light can then reach a projection screen.

Here, because the end edge forming the cutoff of the shutter is preferably slanted downward towards the front side in the optical axis direction, the light proceeding towards the lower edge of the projection lens that had previously been cut off by the end edge of the conventional shutter is now made incident at the projection lens without being cut off, and can reach the projection screen. Thus, the loss in the amount of light resulting from the shutter is minimized, and the amount of effective light reaching the projection screen or intended lighting area is increased.

Moreover, because the shutter is disposed in front of the focal position of the projection lens, the rear edge of the end edge of the shutter can be positioned at the focal position, whereby the loss in the amount of red light transmitted through the upper edge of the projection lens also drops.

Thus, because the red light and the blue light passing through the upper edge and the lower edge of the projection lens are both superposed on each other and irradiated on approximately the same position on the projection screen, the color of the light becomes white due to the colors of the light mixing. Coloring can be further reduced because the projection lens can be configured as an aspherical convex lens that has little chromatic aberration.

In this manner, the loss in the amount of light resulting from the thickness of the shutter can be reduced and the light passing through the upper edge and the lower edge of the projection lens and reaching the projection screen can mix so that the color of the emitted light becomes white. Thus, the amount of effective light on the projection screen can be increased and coloring of emitted light can be further minimized.

The angle of inclination of the end edge of the shutter can be slanted at set angles that differ per respective site. Thus, of the light that is incident at the upper edge or lower edge of the projection lens, the light that is offset in the horizontal direction from the front direction and more affected by the chromatic aberration of the projection lens can be blocked off by the angle of inclination of the thickness of the shutter. Thus, although the amount of light is slightly reduced, coloring of emitted light can be further reduced.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF PREFERRED EMBODIMENTS

Preferred embodiments of the invention will be described in detail below with reference to FIGS. 1-3 and 6.

It should be noted that, although technically preferable features are described in relation to the embodiments below, because the embodiments are only preferred and specific examples of the invention, the scope of the invention is not limited to these embodiments.

Figure 1:
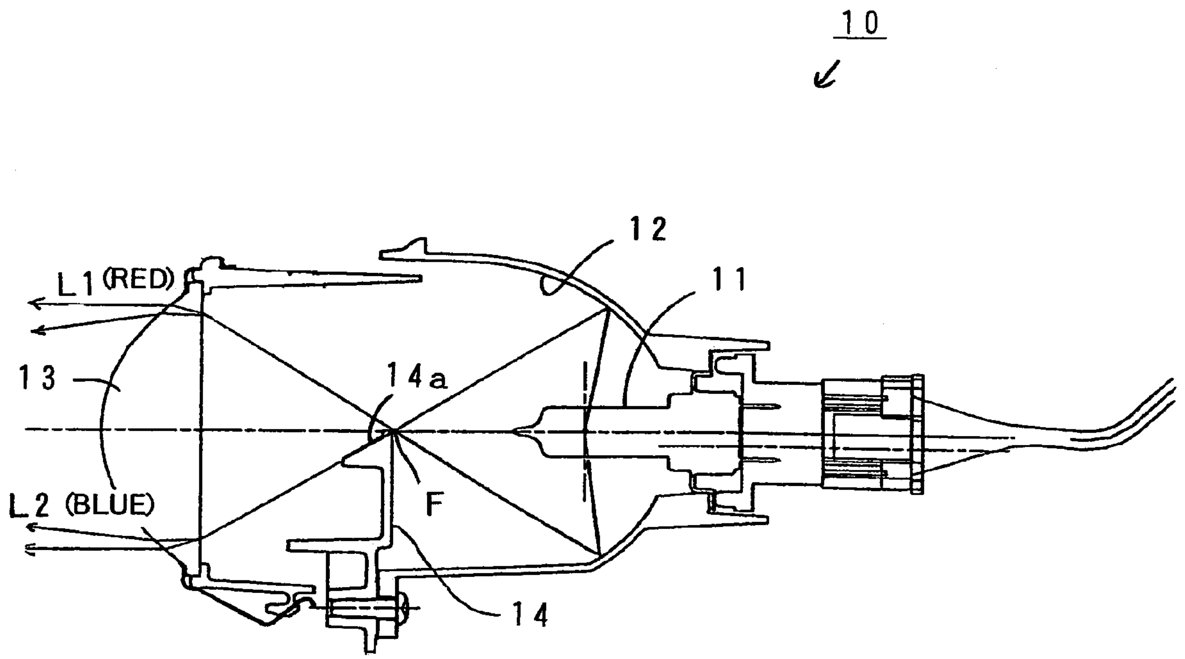
FIG. 1 is a cross-sectional diagram showing the configuration of an embodiment of a vehicle lamp made in accordance with the principles of the invention.

FIG. 1 shows the configuration of a preferred embodiment of the invention formed as a vehicle lamp.

In FIG. 1, a vehicle lamp 10 can be formed as an automobile headlight that includes a bulb 11 serving as a light source, a reflector 12 that reflects light from the bulb 11 frontward, a projection lens 13 that focuses the light reflected from the reflector 12, and a shutter 14 that forms a cutoff for low-beam or other light distribution.

The bulb 11 can be a bulb that is usually used in an automobile headlight or auxiliary headlight. For example, a bulb such as an incandescent lamp or a discharge lamp, like a halogen lamp or a metal halide lamp, can be used as the bulb 11. The bulb 11 can be fixed by and retained in a socket, and electricity can be supplied to the bulb 11 via the socket.

The reflector 12 reflects light from the bulb 11 and can include a frontwardly concave or concave spheroidal surface so as to reflect the light frontward. A light-emitting portion of the bulb 11 can be disposed in the vicinity of a first focal position of the reflector 12.

The spheroidal surface should be configured such that it focuses light from the bulb to the vicinity of a second focal position (with the bulb being located in the vicinity of the first focal position). For example, the spheroidal surface may be a quadratic surface based on a spheroidal surface.

The projection lens 13 can be configured as a convex lens or preferably an aspherical convex lens and can be disposed so that a bulb-side focal position thereof is positioned in the vicinity of a second focal position of the reflector 12.

The shutter 14 is preferably disposed in the vicinity of the second focal position of the reflector 12, i.e., in the vicinity of the bulb-side focal position of the projection lens 13. An end edge (upper edge) 14*a* of the shutter 14 can form a cutoff to generate a low beam light distribution pattern. As is illustrated, the shutter 14 can be formed to be thick in relation to the optical axis direction in order to reduce coloring of emitted light that results from chromatic aberration of the projection lens 13.

Figure 6:
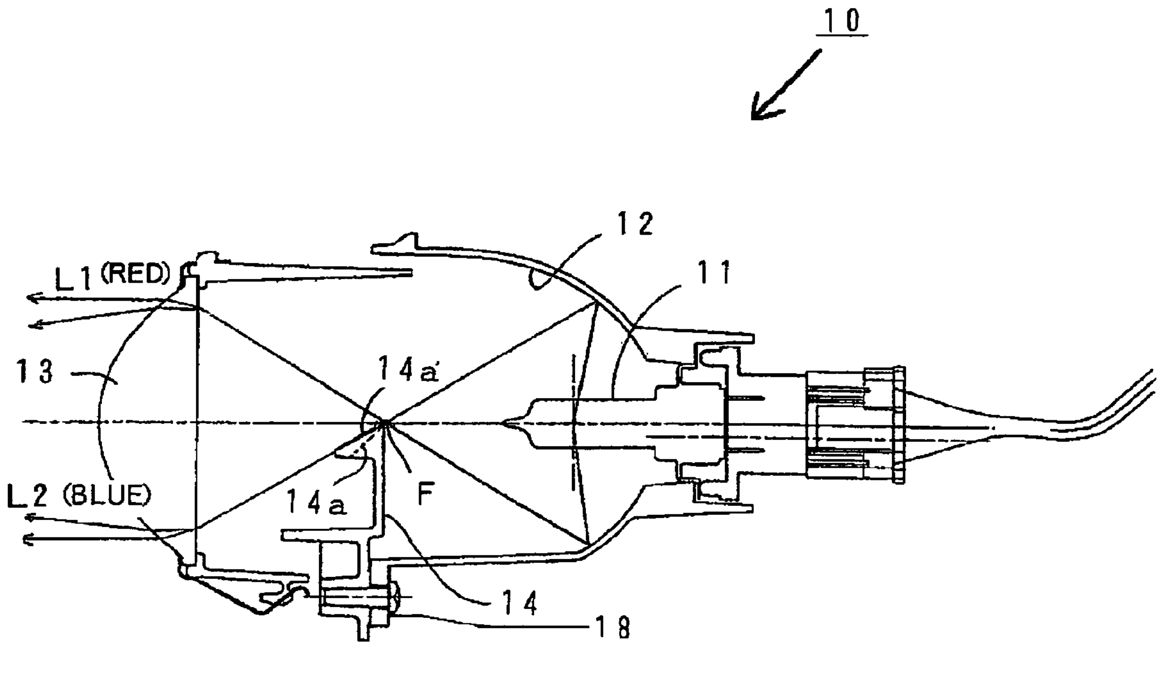
FIG. 6 is a cross-sectional diagram showing the configuration of another embodiment of a vehicle lamp made in accordance with the principles of the invention.

The shutter 14 can be provided with an adjustment mechanism 18 (an embodiment of which is shown in FIG. 6) that allows the shutter 14 to be moved with respect to either the light source, the reflector, the projection lens or any combination of these structures. Thus, the efficiency of the vehicle lamp can be fine tuned before and after it is installed in a vehicle or other operating structure.

In addition, the end edge 14*a* of the shutter 14 can include a front end edge and a rear end edge. The rear end edge can be located at the second focal position of the reflector such that the end edge can extend freely at a slant forward of the second focal position to the front end edge. Thus, the end edge can be made of various thicknesses that extend from the second focal position.

Figure 2:
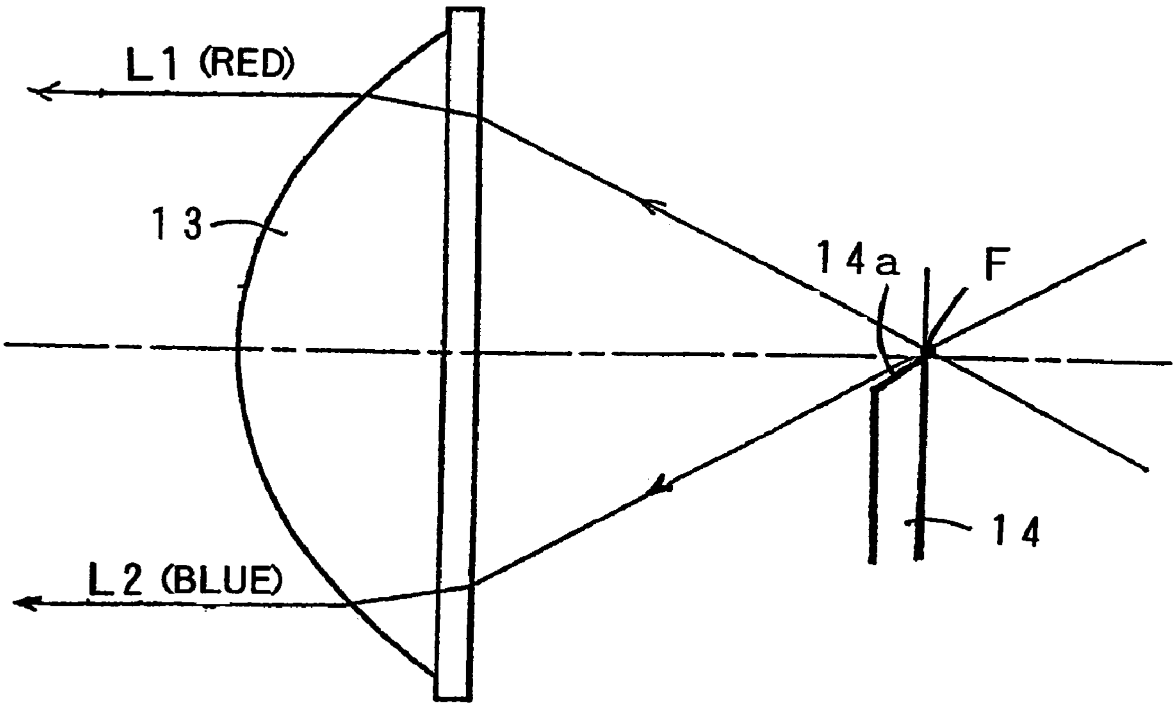
FIG. 2 is a schematic cross-sectional diagram showing relevant portions of the vehicle lamp of FIG. 1.

In the vehicle lamp 10, as shown in detail in FIG. 2, the shutter 14 can be disposed in front of a bulb-side focal point F of the projection lens 13, and the upper surface of the end edge 14*a* can be formed at an inclination so as to become frontwardly lower in relation to the optical axis direction.

The angle of inclination is preferably set such that, when the amount of blue light L2 that is transmittable at this angle, is made incident at the lower edge vicinity of the projection lens 13 and reaches a standard projection screen via the projection lens 13, the amount of blue light L2 becomes substantially the same as the amount of red light L1 transmitted through the upper edge vicinity of the projection lens 13. The blue light L2 and red light L1 are mixed, and the emitted light color becomes white.

Figure 3:
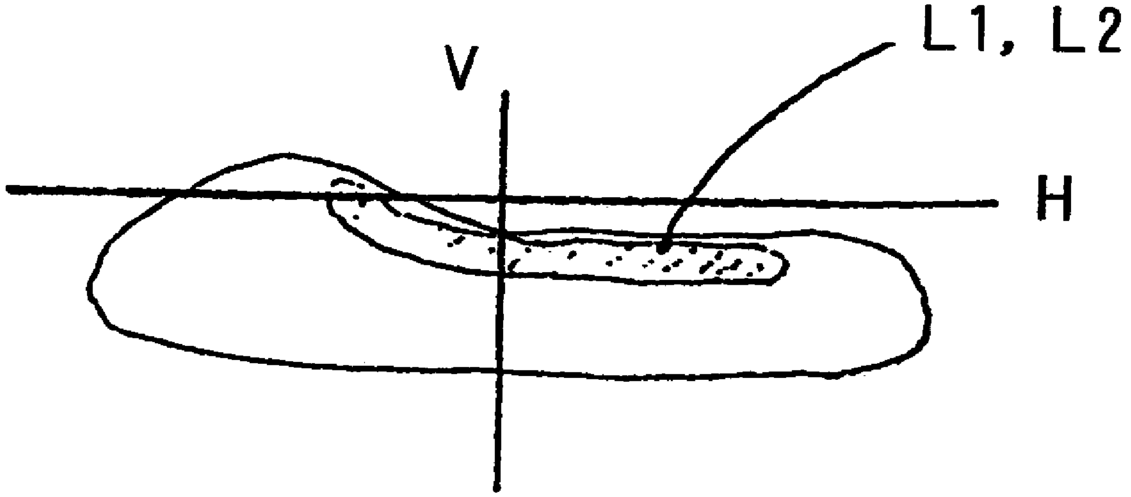
FIG. 3 is a graph showing light distribution characteristics resulting from the vehicle lamp of FIG. 1.
Figure 4:
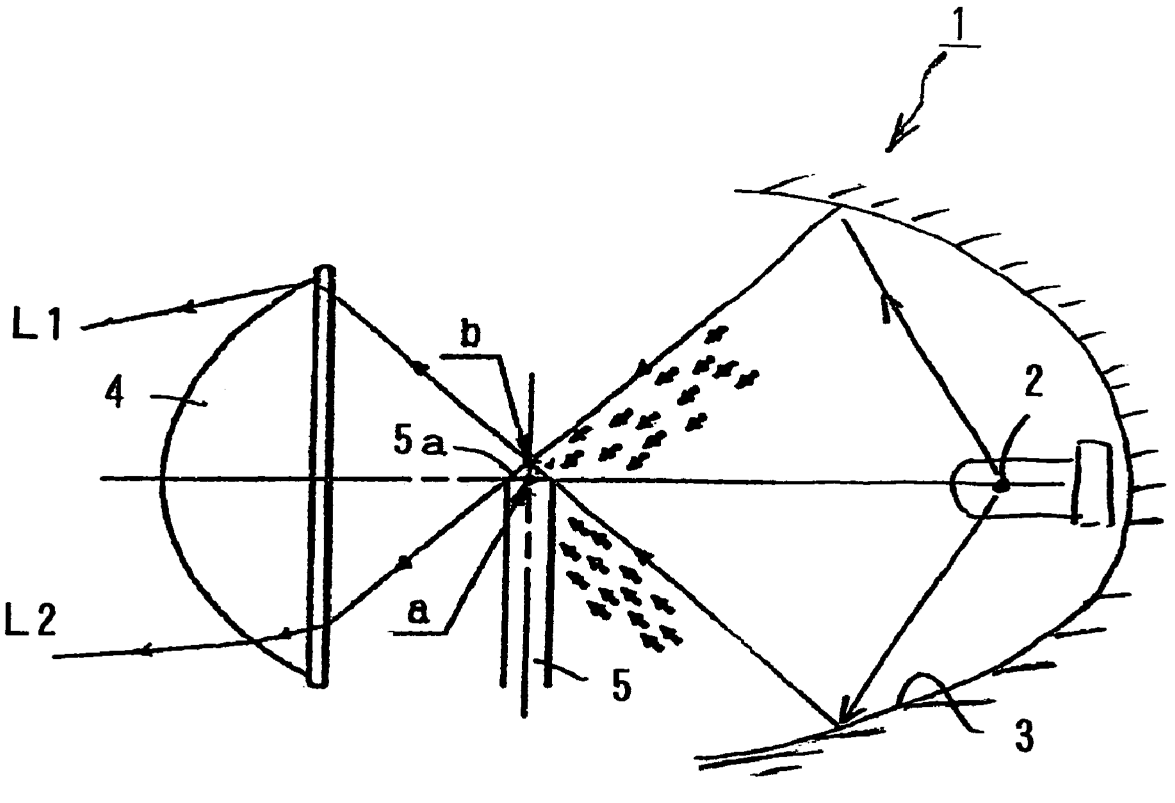
Fig. 4 Conventional Art
FIG. 4 is a schematic cross-sectional diagram showing the configuration of a headlight serving as an example of a conventional vehicle lamp.
Figure 5:
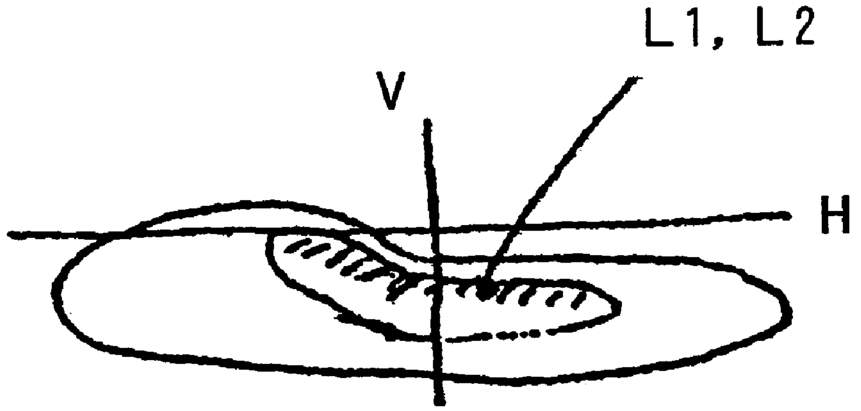
Fig. 5 Conventional Art
FIG. 5 is a graph showing light distribution characteristics resulting from the vehicle lamp of FIG. 4.

The vehicle lamp 10 according to an embodiment of the invention can be configured as described above, so that the light emitted from the bulb 11 is reflected by the reflector 12, proceeds towards the second focal point of the reflector 12, is focused by the projection lens 13 and is irradiated frontward. At this time, a range of a so-called low beam light distribution pattern can be illuminated due to the cutoff being formed by the shutter 14, as shown in FIG. 3.

Because the shutter 14 is thickly formed, the light L1 and the light L2 that is made incident at the upper edge or the lower edge of the projection lens 13 becomes red or blue light due to the chromatic aberration of the projection lens 13, and reaches the projection screen. In this case, as shown in FIG. 2, because the end edge 14*a* forming the cutoff can be downwardly slanted towards the front side of the optical axis direction, the light L2 that proceeds towards the lower edge of the projection lens 13 includes a new portion of light that would have previously been cut off by the end edge of the conventional shutter. This new portion of light can be incident at the projection lens 13 without being cut off, and can eventually reach the projection screen.

Thus, the loss in the amount of light due to the use of shutter 14 can be minimized, and the amount of effective light that reaches the projection screen can be increased.

Moreover, because the shutter 14 is preferably disposed in front of the focal position F of the projection lens 13, the rear edge of the end edge 14*a* of the shutter 14 can be positioned at the focal position F. Thus, the loss in the amount of red light L1 transmitted through the upper edge of the projection lens 13 also drops.

The end edge 14*a* of the shutter 14 is shown as being uniformly slanted towards the front of the lamp with the rear end edge being the highest portion of the shutter 14. However, the shutter can be configured in many different ways. For example, the shutter may be non-uniformly slanted towards the front of the lamp such that the rear end edge of the shutter is not the highest portion of the shutter. In addition, different portions of the shutter 14 can be angled or slanted differently so as to create a particular light distribution pattern and such that certain portions of light are removed from the light distribution pattern.

As shown in FIG. 2, because the red light L1 and the blue light L2 that pass by the upper edge and the lower edge of the projection lens 13 are both superposed on each other and irradiated on approximately the same position on a projection screen, the color of the emitted light becomes white due to the color of the light mixing, whereby coloring of emitted light is aggressively reduced. When combined with the fact that an aspherical convex lens with little chromatic aberration can be used as the projection lens 13, coloring of emitted light can be further reduced.

In this manner, the end edge 14*a* of the shutter 14 can be formed at an inclination so as to become frontwardly lower, whereby the loss in the amount of light resulting from the thickness of the shutter 14 can be reduced and the light L1 and the light L2 passing through the upper edge and the lower edge of the projection lens 13 mix so that the color of the emitted light becomes white. Thus, the amount of effective light on the projection screen can be increased and coloring of emitted light can be further minimized.

Although respective sites of the end edge 14*a* of the shutter 14 are slanted at a set angle of inclination in the above-described embodiment, the invention is not limited thereto and the end edge 14*a* may also be slanted at different angles of inclination per respective site. Thus, for example, by making the angle of inclination of the shutter 14 smaller at both side vicinities, the light made incident at peripheral-most portions of the projection lens 13 that are more susceptible to the influence of the chromatic aberration of the projection lens 13 is selectively cut off, whereby it becomes possible to reduce coloring resulting from the chromatic aberration of the projection lens 13.

FIG. 6 shows a cross-section of a vehicle lamp made in accordance with the principles of the invention and includes a shutter 14 that can be slanted at various angles of inclination per respective site. For example, as shown in FIG. 6, side edges 14*a*' can be slanted at a lesser angle than middle edge 14*a* with respect to the optical axis such that light made incident at peripheral-most portions of the projection lens 13 that is more susceptible to the influence of the chromatic aberration of the projection lens 13 is selectively cut off.

Also, in the above-described embodiments, the vehicle lamp 10 is described with respect to a case where the invention is embodied in an automobile headlight. However, the invention is not limited thereto. It should be apparent that the invention can also be applied to an auxiliary headlight, such as a fog lamp, tail light, turning light, search light and other light that might benefit from the same light distribution characteristics.

As described above, the end edge of the shutter forming the cutoff can be slanted downward towards the front side of the optical axis direction, whereby the loss in the amount of light resulting from the thickness of the shutter can be reduced and the light passing through the upper edge and the lower edge of the projection lens that reaches the projection screen can be mixed so that the color of the emitted light becomes approximately white. Thus, the amount of effective light on the projection screen can be increased and coloring can be minimized.

In this manner, an extremely excellent vehicle lamp that is suited for a headlight or an auxiliary headlight, is inexpensive due to its simple configuration, reduces coloring resulting from chromatic aberration of the projection lens, and which is configured to control the loss in light amount resulting from the thickness of the shutter can be provided.

While illustrative and presently preferred embodiments of the present invention have been described in detail herein, it is to be understood that the inventive concepts may be incorporated in different variations and embodiments and that the appended claims are intended to be construed to include such variations except insofar as limited by the prior art.

What is claimed is:

1. A vehicle lamp comprising:

a light source;

a reflector whose first focal position lies in the vicinity of the light source, the reflector including a concave surface that reflects light from the light source frontward in an optical axis direction;

a projection lens that is disposed so that its focal point lies in the vicinity of a second focal position of the reflector in front of the light source, the projection lens including a convex lens that focuses light from the reflector and that irradiates the light frontward; and a shutter that is disposed in the vicinity of the second focal position of the reflector, the shutter having an end edge that includes a rear end edge and a front end edge, the end edge forming a cutoff for light distribution, wherein the shutter is thickly formed so that the rear end edge is located substantially at a plane that is substantially perpendicular to the optical axis direction and contains the focal point of the projection lens, and the front end edge is positioned in front of the location of the focal point of the projection lens in the optical axis direction, the end edge of the shutter being slanted so that the shutter becomes lower towards the projection lens in relation to the optical axis direction of the vehicle lamp.

2. The vehicle lamp of claim 1, wherein the angle of slant at the end edge of the shutter is set at angles that differ per respective site along a length of the end edge.

3. The vehicle lamp of claim 1, wherein the shutter includes an adjustment device for changing a position of the shutter with respect to one of the light source, projection lens and reflector.

4. The vehicle lamp of claim 1, wherein the rear end edge is located at the second focal position of the reflector.

5. The vehicle lamp of claim 1, wherein the concave surface of the reflector includes a concave spheroidal surface.

6. The vehicle lamp of claim 1, wherein the convex lens of the projection lens includes an aspherical convex lens.

7. The vehicle lamp of claim 1, wherein the light distribution is a low-beam light distribution pattern.

8. A method for operating the vehicle lamp of claim 1, comprising:

applying electricity to the light source;

reflecting light from the light source towards the projection lens;

blocking a portion of light passing from the reflector to the projection lens by the end edge of the shutter;

allowing a top edge portion of light to pass from the reflector to a top edge of the projection lens; and allowing a bottom edge portion of light to pass from the reflector to a bottom edge of the projection lens such that the top edge portion of light mixes with the bottom edge portion of light to emit an approximately white light from the vehicle lamp.

9. A vehicle lamp comprising:

a light source for irradiating light along an optical axis;

a reflector having a first focal position approximately at the light source and a second focal position in front of the light source, the reflector including a concave surface that reflects light from the light source frontward;

a projection lens having a focal point approximately at the second focal position of the reflector, the projection lens including a convex lens that focuses light from the reflector and that irradiates the light frontward; and a shutter that is disposed approximately at the second focal position of the reflector, the shutter having an end edge forming a light distribution cutoff, wherein the end edge has a front end edge and a rear end edge, the rear end edge of the shutter being located substantially at a location of the second focal position in the optical axis direction, and the end edge being slanted at an angle with respect to the optical axis such that the front end edge is further from both the optical axis and the second focal position than the rear end edge, and wherein the rear end edge of the shutter is located closer to the light source than the front end edge of the shutter.

10. The vehicle lamp of claim 9, wherein the end edge has a length that is perpendicular to the optical axis, and the angle of slant of the end edge of the shutter differs along the length of the end edge.

11. A vehicle lamp comprising:

a light source;

a reflector having a first focal position located in the vicinity of the light source and a second focal position located in front of the light source, the reflector including a concave surface that reflects light from the light source frontward;

a projection lens that is disposed so that its focal point lies in the vicinity of the second focal position of the reflector, the projection lens including a convex lens that focuses light from the reflector and that irradiates the light frontward, the projection lens including an upper edge and a lower edge;

a shutter located in the vicinity of the second focal position, the shutter having a predetermined thickness and including means for reducing a loss in the amount of light that results from the thickness of the shutter and for mixing light passing though the upper edge and the lower edge of the projection lens such that the color of light emitted from the vehicle lamp is approximately white, wherein the means for reducing and mixing includes an end edge of the shutter that has a front end edge and rear end edge, the end edge configured to form a cutoff for light distribution and being slanted at an angle with respect to an optical axis of the vehicle lamp such that the front end edge is further from both the optical axis and the second focal position than the rear end edge, and wherein the rear end edge of the shutter is located closer to the light source than the front end edge of the shutter, and the shutter includes means for adjusting a position of the shutter with respect to one of the light source, projection lens and reflector.

12. The vehicle lamp of claim 11, wherein the angle of slant of the end edge of the shutter is set at angles that differ along a length of the end edge.

13. The vehicle lamp of claim 9, wherein the shutter includes means for adjusting a position of the shutter with respect to one of the light source, projection lens and reflector.

* * * * *